US009174494B2

(12) United States Patent
Matsumoto

(10) Patent No.: US 9,174,494 B2
(45) Date of Patent: Nov. 3, 2015

(54) PNEUMATIC TIRE WITH TREAD HAVING FIRST LUG GROOVES AND FIRST, SECOND AND THIRD INCLINED GROOVES

(71) Applicant: The Yokohama Rubber Co., LTD., Minato-ku, Tokyo (JP)

(72) Inventor: Kenichi Matsumoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/410,007

(22) PCT Filed: Jul. 24, 2013

(86) PCT No.: PCT/JP2013/069980
§ 371 (c)(1),
(2) Date: Dec. 19, 2014

(87) PCT Pub. No.: WO2014/091789
PCT Pub. Date: Jun. 19, 2014

(65) Prior Publication Data
US 2015/0191050 A1   Jul. 9, 2015

(30) Foreign Application Priority Data

Dec. 11, 2012 (JP) ................... 2012-270398
Feb. 5, 2013 (JP) ................... 2013-020037

(51) Int. Cl.
*B60C 11/03* (2006.01)
*B60C 11/12* (2006.01)
(Continued)

(52) U.S. Cl.
CPC . *B60C 11/12* (2013.01); *B60C 5/00* (2013.01); *B60C 11/0302* (2013.04);
(Continued)

(58) Field of Classification Search
CPC ............ B60C 11/0302; B60C 2011/0374; B60C 2011/0381; B60C 2011/0383; B60C 2011/0388; B60C 11/12; B60C 2011/1213
USPC ........................ D12/552, 558, 563
See application file for complete search history.

(56) References Cited

U.S. PATENT DOCUMENTS

D603,326 S  *  11/2009  Chung et al. ............. D12/552
2009/0308515 A1   12/2009  Matsunaga
(Continued)

FOREIGN PATENT DOCUMENTS

EP    2 463 123        6/2012
JP    06-199109 A  *  7/1994
(Continued)

OTHER PUBLICATIONS

Machine translation for Japan 2010-167930 (no date).*
(Continued)

*Primary Examiner* — Steven D Maki
(74) *Attorney, Agent, or Firm* — Thorpe North & Western

(57) ABSTRACT

A tread pattern of a pneumatic tire includes: first inclined grooves having positions located separated from a center line as starting ends and extending in a first direction of the tire circumferential direction; first lug grooves extending from respective ends on the outer side in the tire width direction of the first inclined grooves in the first direction of the tire circumferential direction, and having an angle formed with the tire width direction smaller than an angle formed with tire width direction of the first inclined grooves; second inclined grooves extending from the respective ends on the outer side in the tire width direction of the first inclined grooves in the first direction of the tire circumferential direction; and third inclined grooves extending from respective intermediate points on the first lug grooves in the first direction of the tire circumferential direction.

20 Claims, 6 Drawing Sheets

(51) Int. Cl.
*B60C 11/13* (2006.01)
*B60C 11/16* (2006.01)
*B60C 11/04* (2006.01)
*B60C 5/00* (2006.01)

(52) U.S. Cl.
CPC ............ *B60C 11/04* (2013.01); *B60C 11/1263* (2013.04); *B60C 11/13* (2013.01); *B60C 11/16* (2013.01); *B60C 2011/0374* (2013.04); *B60C 2011/0381* (2013.04); *B60C 2011/0383* (2013.04); *B60C 2011/0388* (2013.04); *B60C 2011/1213* (2013.04)

(56) References Cited

U.S. PATENT DOCUMENTS

| | | |
|---|---|---|
| 2010/0126645 A1 | 5/2010 | Barboza et al. |
| 2010/0282390 A1 | 11/2010 | Mariani et al. |

FOREIGN PATENT DOCUMENTS

| | | | |
|---|---|---|---|
| JP | H08-142613 | | 6/1996 |
| JP | H09-188109 | | 7/1997 |
| JP | H10-264612 | | 10/1998 |
| JP | 2009/298387 | | 12/2009 |
| JP | 4381787 | | 12/2009 |
| JP | 2010-167930 A | * | 8/2010 |
| JP | 2010/167931 | | 8/2010 |
| JP | 2010-167931 A | * | 8/2010 |
| JP | 2011-502851 | | 1/2011 |
| KR | 2002-0003659 A | * | 1/2002 |
| RU | 74473 S | * | 4/2010 |
| WO | WO 2013/011681 | | 1/2013 |

OTHER PUBLICATIONS

Machine translation for Japan 2010-167931 (no date).*
Machine translation for Korea 2002-0003659 (no date).*
International Search Report for International Application No. PCT/JP2013/069980 dated Sep. 10, 2013, 4 pages, Japan.

* cited by examiner

PNEUMATIC TIRE WITH TREAD HAVING FIRST LUG GROOVES AND FIRST, SECOND AND THIRD INCLINED GROOVES

TECHNICAL FIELD

The present technology relates to a pneumatic tire having a tread pattern formed in the tread portion.

BACKGROUND

Conventionally in pneumatic tires for use in winter as represented by, for example, studded tires, a tread pattern that includes a plurality of grooves extending in the tire circumferential direction and the tire width direction is provided in the tread portion, in order to ensure traction (driving performance) on snow. It is required that these pneumatic tires have traction on snow, and also have no reduction in braking and driving performance on dry road surfaces with no snow.

It is known that by reducing the percentage of groove area in the tread portion, specifically reducing the area of the grooves as a percentage of the ground contact area in the ground contact patch, and increasing the ground contact area, the adhesion friction force is increased, and the performance of the pneumatic tire on ice is increased. On the other hand, it is known that by increasing the groove area, the drainage characteristics are improved by the tread pattern when the tire is rolling on a wet road surface with a water film.

There are pneumatic tires in which grooves are cyclically formed with a predetermined interval in the tire circumferential direction, and by offsetting their phases on a first side and a second side in the tire width direction with respect to the tire center line, the pattern noise is improved (for example, see Japanese Patent No. 4381787B).

Also, there are pneumatic tires in which a center rib is provided in the center of the tread portion by forming a plurality of grooves in the circumferential direction, and the occurrence of pattern noise is reduced while maintaining drainage characteristics (for example, see Japanese Unexamined Patent Application Publication No. H10-264612A).

Also, there are pneumatic radial tires in which a plurality of inclined grooves is provided at intervals in the circumferential direction inclined from the tire center line side towards the shoulder portion, and, with a structure in which the end portions of the inclined grooves on the center line side are connected to adjacent other inclined grooves, heel and toe wear is reduced (for example, see Japanese Unexamined Patent Application Publication No. H8-142613A).

However, if the ground contact area is increased and the adhesion friction force is raised in order to improve the performance on ice of a pneumatic tire, the drainage characteristics are reduced by the reduction in groove area, and the wet performance (turning performance and braking and driving performance on wet road surfaces) is reduced. Also, the shear force in the snow column (snow column shear force) created by compressing snow into the grooves is reduced, and the performance on snow (turning performance and braking performance on snow) is reduced.

On the other hand, when the groove area is increased in order to increase the drainage characteristics and the snow column shear force, the ground contact area is reduced and the adhesion friction force is reduced, so the performance on ice (turning performance and braking and driving performance on ice) is reduced.

SUMMARY

The present technology provides a pneumatic tire with higher performance on ice, performance on snow, and wet performance.

One aspect of the present technology is a pneumatic tire. In the pneumatic tire, a tread pattern is formed in each of half tread regions of a tread portion located on both sides in the tire width direction with a tire center line as a boundary.

Each half tread region include:

a first inclined groove group having a plurality of first inclined grooves provided in the tire circumferential direction, the first inclined grooves having positions located separated from the center line as starting ends and extending in a first direction of the tire circumferential direction as well as at an inclination towards the outer side in the tire width direction;

a first lug groove group having a plurality of first lug grooves provided in the tire circumferential direction, the first lug grooves extending from the respective end portions on the outer side in the tire width direction of the first inclined grooves as well as at an inclination towards the outer side in the tire width direction as far as ground contact edge, and having an angle formed with the tire width direction smaller than an angle formed with the tire width of the first inclined grooves;

a second inclined groove group having a plurality of second inclined grooves provided in the tire circumferential direction, the second inclined grooves extending from the respective end portions on the outer side in the tire width direction of the first inclined grooves in the first direction of the tire circumferential direction as well as at an inclination towards the inner side in the tire width direction; and a third inclined groove group having a plurality of third inclined grooves provided in the tire circumferential direction, the third inclined grooves extending from respective intermediate points on the first lug grooves in the first direction of the tire circumferential direction as well as at an inclination to the outer side in the tire width direction, and having an angle formed with the tire width direction larger than the angle formed with the tire width direction of the first lug grooves.

Each third inclined groove is closed without reaching another first lug groove located adjacent to each first lug groove in the first direction.

In this case, preferably the pneumatic tire further includes branch grooves extending from respective intermediate points on the first inclined grooves towards the center line, each branch groove having a groove bottom shallower than a groove bottom of the first inclined groove with a step at a branching position where each branch groove branches from each first inclined groove, and a groove depth of the branch groove being gradually shallower towards the center line.

Also, preferably the branch grooves are closed before reaching the center line. Each branch groove is demarcated by a first edge located on a side in the first direction, and a second edge located on a side in a direction opposite to the first direction, and one of the first edge and the second edge extends in a curved line shape, and the other extends in a straight line shape.

The branch grooves may be fourth inclined grooves extending in the first direction of the tire circumferential direction and at an inclination to the inner side in the tire width direction.

The branch grooves may be fourth inclined grooves extending in a second direction opposite to the first direction of the tire circumferential direction or may be grooves extending parallel to the tire width direction.

Also, preferably the pneumatic tire further includes branch grooves extending from respective intermediate points on the first inclined grooves towards the center line. In this case, second lug grooves are provided between two of the plurality of first lug grooves located adjacent to each other in the tire circumferential direction, each extending parallel to the first lug grooves, and when a distance in the tire circumferential direction between one of the first lug grooves and one of the second lug grooves located adjacent to each other in the tire circumferential direction, is Le, preferably the branching positions in the tire circumferential direction where the branch grooves branch from the first inclined grooves are each located in a region 0.2 or greater and 0.8 or less times the distance Le away from a position A in the tire circumferential direction at the ground contact edge of the first lug groove towards a position B in the tire circumferential direction at the ground contact edge of the second lug groove.

Preferably the second lug grooves are provided between two of the plurality of first lug grooves located adjacent to each other in the tire circumferential direction, each extending parallel to the first lug grooves.

Preferably the second inclined grooves each extends at least as far as another first inclined groove located adjacent in the tire circumferential direction.

Alternatively, the second inclined grooves each preferably passes through and extends beyond another first inclined groove located adjacent in the tire circumferential direction.

Preferably the second lug grooves are provided between two of the plurality of first lug grooves located adjacent to each other in the tire circumferential direction, each extending parallel to the first lug grooves, and the third inclined grooves extend at least as far as the second lug grooves.

Also, preferably the second lug grooves are provided between two of the plurality of first lug grooves located adjacent to each other in the tire circumferential direction, each extending parallel to the first lug grooves, and the third inclined grooves pass through and extend beyond the second lug grooves.

In this case, preferably a groove width of portions of the second lug grooves on the inner side in the tire width direction of crossing sections with the third inclined grooves is narrower than a groove width of portions on the outer side in the tire width direction of the crossing sections with the third inclined grooves.

Preferably the angle between the straight line joining both ends of each first inclined groove and the tire width direction is from 50° to 80°.

Preferably the angle between the straight line joining both ends of each second inclined groove and the tire width direction is from 10° to 65°.

Preferably the angle between the straight line joining both ends of each third inclined groove and the tire width direction is from 50° to 80°.

Preferably the starting ends of the first inclined grooves of the first inclined groove group on a first side of the center line are offset in the tire circumferential direction from the starting ends of the first inclined grooves of the first inclined groove group on a second side by $1/10$ to $4/10$ of the average distance in the tire circumferential direction between adjacent first inclined grooves.

In addition, preferably a plurality of sipes is provided in the land portions of the tread portion, and sipes provided in the land portions enclosed by the first lug grooves, the first inclined grooves, the second inclined grooves, and the tread ground contact edges are inclined with respect to sipes provided in the land portions on the inner side in the tire width direction of the first inclined grooves and the second inclined grooves.

Preferably stud installation holes are provided in the land portions enclosed by the first lug grooves, the first inclined grooves, the second inclined grooves, and the tread ground contact edges.

According to the aspects as described above, it is possible to provide a pneumatic tire with higher performance on ice, performance on snow, and wet performance.

DETAILED DESCRIPTION

Embodiments of the present technology will be described below in detail with reference to the drawings.

Figure 1:
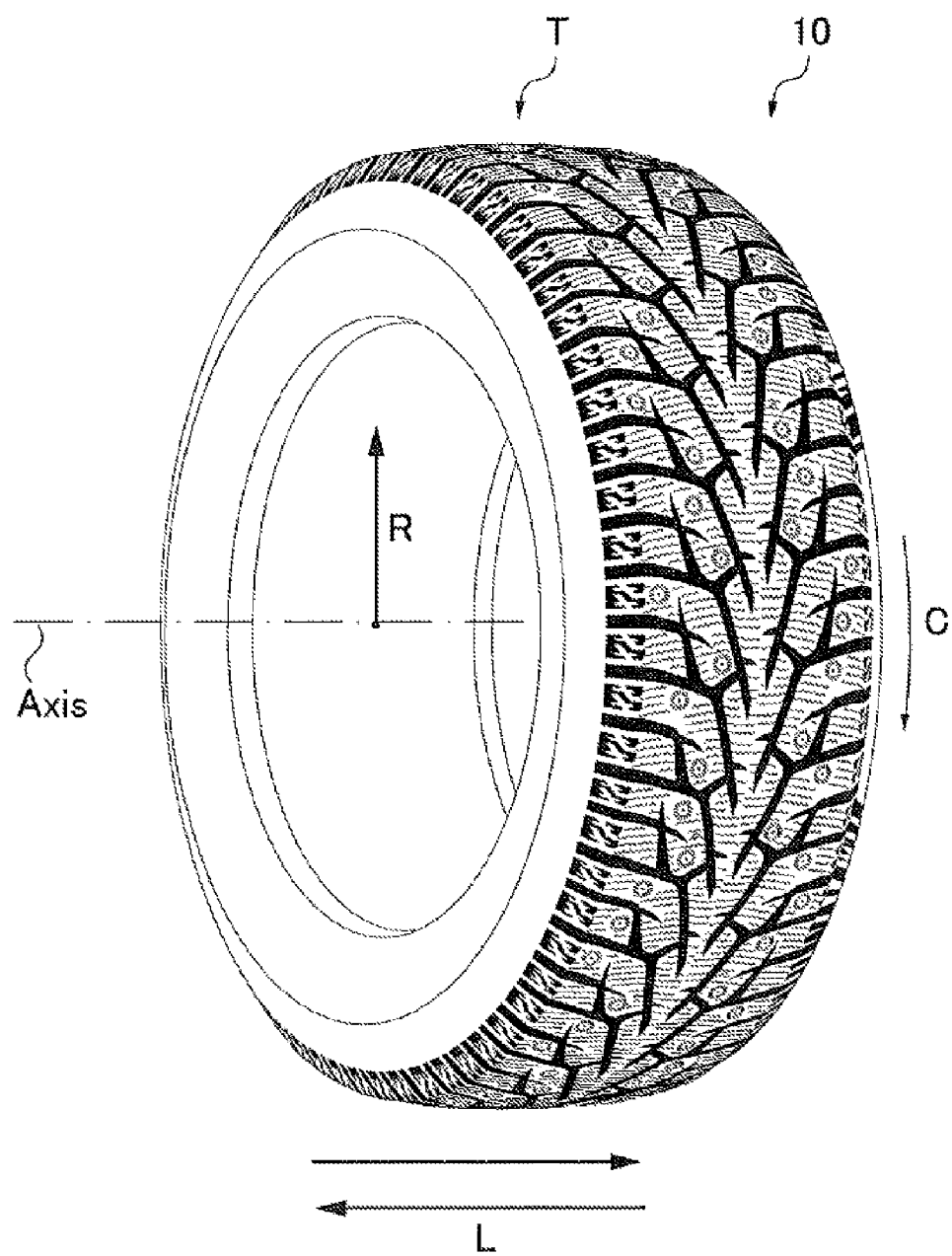
FIG. 1 is a perspective view illustrating a pneumatic tire according to an embodiment of the present technology.

FIG. 1 is a perspective view illustrating a pneumatic tire 10 according to an embodiment of the present technology.

The pneumatic tire 10 (hereafter referred to as tire 10) is a tire for a passenger car.

The structure and rubber members of the tire 10 according to the present technology may be either publicly known or novel, and are not particularly limited in the present technology.

The tire width direction L is a direction parallel to the rotational axis Axis of the pneumatic tire 10. The outer side in the tire width direction refers to sides in the two directions in the tire width direction L distant from the tire center line CL (see FIG. 3). Also, the inner side in the tire width direction refers to sides in the two directions in the tire width direction L approaching the tire center line CL. The tire rotation direction C is a direction in the tire circumferential direction in which the tread portion T rotates about the tire rotational axis Axis when the tire is fitted to a vehicle and the vehicle is traveling forward. The tire radial direction R is a direction orthogonal to the rotational axis Axis of the pneumatic tire. The outer side in the tire radial direction is a side distant from the rotational axis Axis. Also, the inner side in the tire radial direction is a side approaching the rotational axis Axis.

Tire ground contact edges E1, E2 and ground contact width W which are described below refer to the maximum straight-line distance between the ground contact edges in the tire width direction L on the ground contact patch formed on a flat plate when a load in the vertical direction is applied to the tire on the flat plate under conditions in which the tire is fitted to a standard rim, the internal pressure of the tire is set to a prescribed internal pressure, for example, 200 kPa, and the load is set to 88% of a prescribed load. Herein, "standard rim" refers to a "measuring rim" defined by the European Tyre and Rim Technical Organisation (ETRTO), (2011 version). "Standard rim" also refers to an "applied rim" defined by the Japan Automobile Tyre Manufacturers Association (JATMA), or a "design rim" defined by the Tire and Rim Association (TRA). Also, prescribed internal pressure refers to the "inflation pressures" defined by ETRTO. Alternatively, the prescribed internal pressure can refer to the "maximum air pressure" defined by JATMA, or the maximum value of the "tire load limits at various cold inflation pressures" defined by TRA. Also, the prescribed load refers to the "load capacity" defined by ETRTO. Alternatively, the prescribed load can refer to the "maximum load capacity" defined by JATMA, or the maximum value of the "tire load limits at various cold inflation pressures" defined by TRA.

(Tire Structure)

Figure 2:
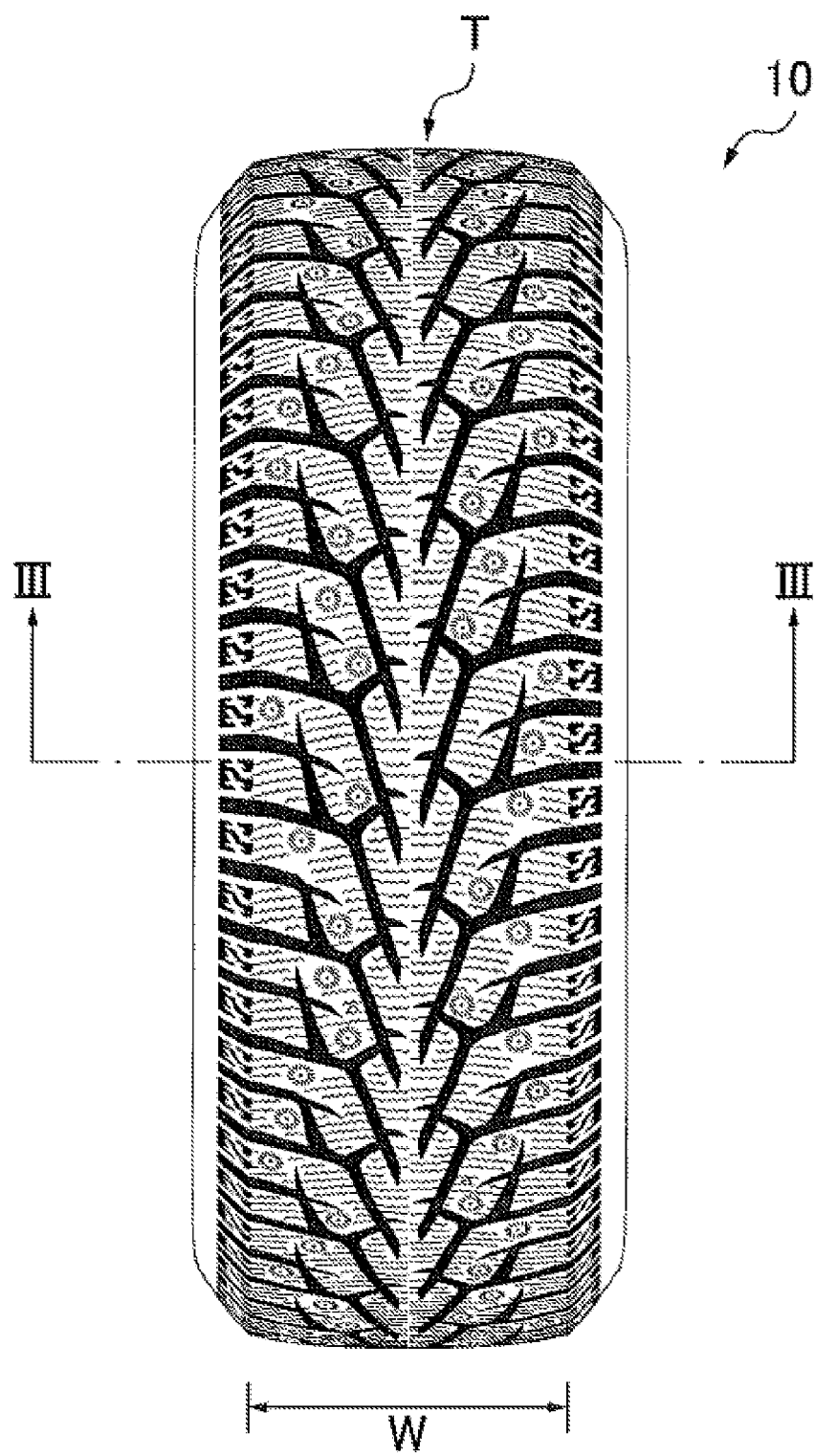
FIG. 2 is a front view of a pneumatic tire according to the embodiment of the present technology.
Figure 3:
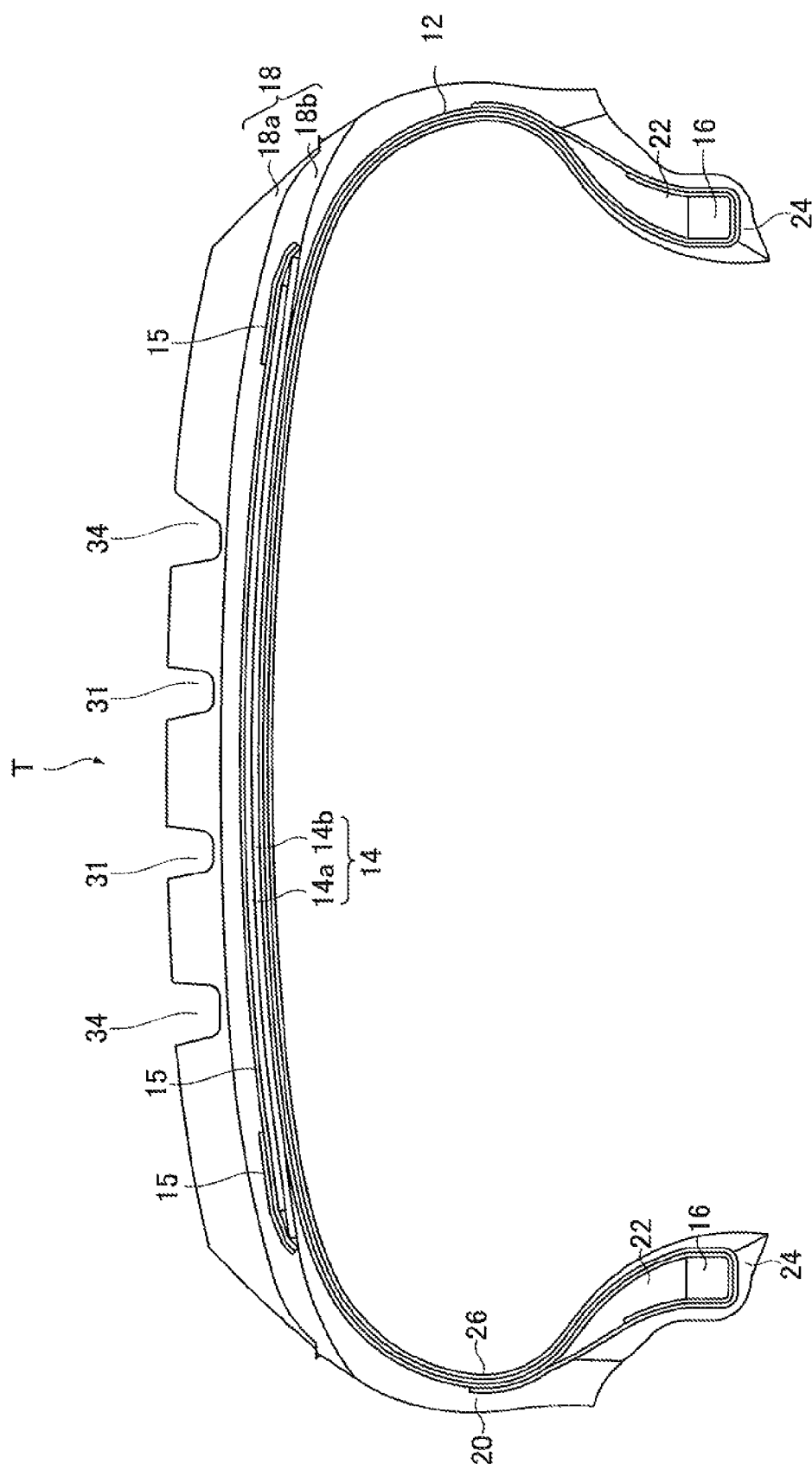
FIG. 3 is a cross-sectional view taken along the line III-III of FIG. 2.

FIG. 2 is a front view of the pneumatic tire 10, and FIG. 3 is a cross-sectional view taken along the line III-III of FIG. 2.

As illustrated in FIG. 3, the tire 10 includes a carcass ply layer 12, a belt layer 14, and bead cores 16 as skeleton members. The tire 10 mainly includes a tread rubber member 18, side wall rubber members 20, bead filler rubber members 22, rim cushion rubber members 24, and an inner liner rubber member 26, around these skeleton members.

The carcass ply layer 12 is constituted of a carcass ply member which is formed in a toroidal shape wound between a pair of circular ring shaped bead cores 16 and is made up of organic fiber coated with rubber. The carcass ply layer 12 is wound around the bead cores 16. The belt layer 14 constituted of two belt members 14a, 14b is provided on the outer side in the tire radial direction of the carcass ply layer 12. Each of the belt members 14a, 14b is a member made up of steel cords coated with rubber and arranged at a predetermined angle, for example inclined at 20 to 30°, to the tire rotation direction C, and the belt member 14b in the lower layer has a width in the tire width direction wider than the width of the belt member 14a in the upper layer. The inclination directions of the steel cords of the two layers of the belt members 14a, 14b are in the opposite direction to each other. Therefore, the belt members 14a, 14b are crossing layers, and they reduce the expansion of the carcass ply layer 12 due to the inflation air pressure.

The tread rubber member 18 is provided on the outer side in the tire radial direction of the belt member 14a. The tread rubber member 18 includes a first tread rubber member 18a forming the outermost layer, and a second tread rubber member 18b provided on the inner side in the tire radial direction of the first tread rubber member 18a. The side wall rubber members 20 are connected to both end portions of the tread rubber member 18 to form side portions. The rim cushion rubber members 24 are provided at the ends on the inner sides in the tire radial direction of the side wall rubber members 20, and come into contact with a rim on which the tire 10 is fitted. On the outer sides in the tire radial direction of the bead cores 16, the bead filler rubber members 22 are provided so as to be held between the portion of the carcass ply layer 12 that is not wound around the bead core 16 and the portion of the carcass ply layer 12 that is wound around the bead core 16. An inner liner rubber member 26 is provided on the inner surface of the tire 10 facing the tire cavity region that is enclosed by the tire 10 and the rim and is adapted for being filled with air.

In addition, a belt cover layer 15 made from organic fiber covered with rubber that covers the belt layer 14 from the outer side in the tire radial direction of the belt layer 14 is provided to strengthen the belt layer 14. Also, the tire 10 can include a bead reinforcing member between the carcass ply layer 12 wound around the bead core 16 and the bead filler rubber member 22.

The tire 10 has such a tire structure, but the structure of the pneumatic tire according to the present technology is not limited to the tire structure illustrated in FIG. 1.

Figure 4:
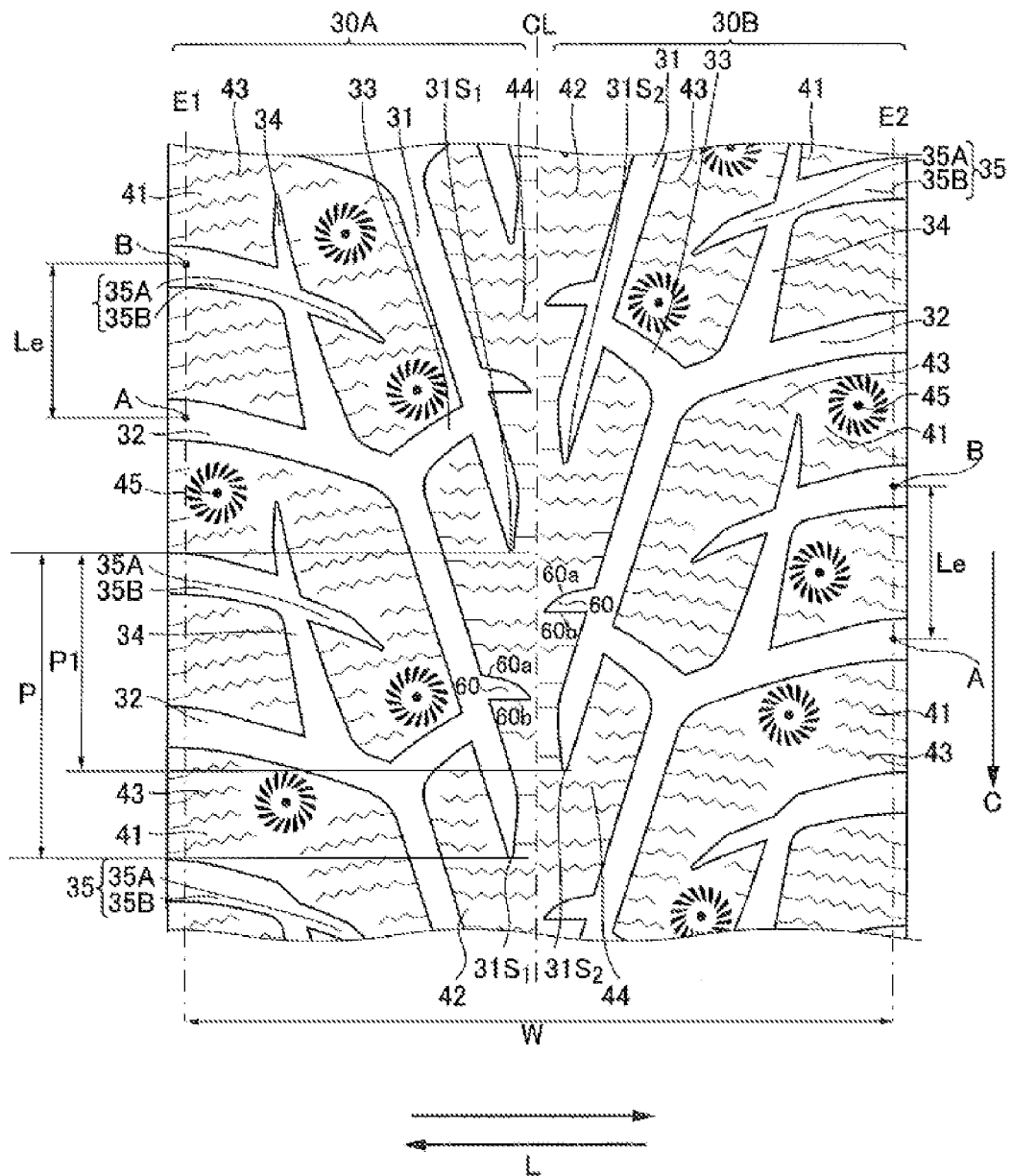
FIG. 4 is a developed view illustrating a tread pattern of the pneumatic tire according to the embodiment of the present technology.

FIG. 4 is a developed view illustrating tread patterns 30A, 30B of the pneumatic tire 10. As illustrated in FIG. 4, in the tire 10 according to the present technology, the tread patterns 30A, 30B, which characterize the present technology, are formed in the tread portion T in the half tread regions on both sides in the tire width direction bounded by the tire center line CL. The tire 10 having the tread patterns 30A, 30B can be beneficially used as a tire for passenger cars. The tread patterns illustrated in FIG. 4 are provided with stud installation holes for installing stud pins, but the stud installation holes need not be provided in the tread patterns. As illustrated in FIG. 4, ridge shaped protrusions that extend linearly, from around the stud installation holes, in a direction inclined with respect to the radial direction of the holes are provided around the holes. The ridge shaped protrusions are formed in order to identify the mounting positions of the stud pins. As illustrated in FIG. 4, no sipe is provided in the region around the stud installation holes and the ridge shaped protrusions.

The tire rotation direction of the tire 10 according to the present technology is predetermined, and the tire 10 is fitted to a vehicle so that the tire 10 rotates in the tire rotation direction C in FIG. 1 when the vehicle is moving forward. Symbols and information indicating this rotational moving direction are displayed on the surfaces of the side wall rubber members 20 of the tire 10. When the tire 10 rotates in the tire rotation direction C, the tread portion T moves in rotation from top to bottom in FIG. 4, and the position where the tread portion T comes into contact with the road surface moves from bottom to top in FIG. 4.

In FIG. 4, the symbol CL indicates the tire center line. With the tire 10 fitted to a vehicle, the tread patterns 30A, 30B come into contact with the road surface in a region in the tire width direction indicated by the ground contact width W.

Here, the interval between the ground contact edges E1, E2 is the ground contact width W. The ground contact edges E1, E2 are both end portions in the tire width direction of the ground contact patch when the tire 10 is brought into contact with a horizontal surface under conditions in which the tire 10 is fitted to a standard rim and is inflated at the prescribed internal pressure, and a load to be applied is set to 88% of the prescribed load.

In the present technology, the tire width direction refers to a direction of the rotation central axis of the tire 10, and the tire circumferential direction refers to a rotation direction of the rotation surface of the tread surface, the rotation surface being formed when the tire 10 is rotated about the rotation central axis of the tire 10. FIG. 4 indicates these directions.

The tread patterns 30A, 30B illustrated in FIG. 4 are each provided with a first inclined groove group having a plurality of first inclined grooves 31, a first lug groove group having a plurality of first lug grooves 32, a second inclined groove group having a plurality of second inclined grooves 33, and a third inclined groove group having a plurality of third inclined grooves 34. The first inclined groove group, the first lug groove group, the second inclined groove group, and the third inclined groove group are provided on both sides in the tire width direction bounded by the center line CL.

The plurality of first inclined grooves 31 is provided in the tire circumferential direction. The first inclined grooves 31 have positions located separated from the center line CL as starting ends, extend in the opposite direction to the tire rotation direction C, and extend at an inclination towards the outer side in the tire width direction. The first inclined grooves 31 have a shape in which the groove width gradually widens towards the outer side in the tire width direction, and the groove width gradually narrows towards the starting end. Preferably the angle between the straight line joining the center point in the groove width direction at the starting end of the first inclined groove 31 (a tip when there is no groove width at the starting point) and the center point in the groove width direction at the end of the first inclined groove 31 on the outer side in the tire width direction and the tire width direction is from 50° to 80°. Hereafter, this angle is referred to as the inclination angle of the first inclined grooves 31. When the inclination angle of the first inclined grooves 31 is 50° or greater, the turning performance of the tire 10 (the turning performance on ice, snow, and on wet road surfaces) is improved. On the other hand, when the inclination angle of the first inclined grooves 31 is 80° or less, the braking performance of the tire 10 (the braking performance on ice, on snow, and on wet road surfaces) is improved.

If the starting ends of the first inclined grooves 31 of the first inclined groove group on a first side of the center line CL are $31S_1$, the starting ends of the first inclined grooves 31 of the first inclined groove group on a second side of the center line CL are $31S_2$, the average interval in the tire circumferential direction between starting ends $31S_1$ and between starting ends $31S_2$ is P, and the average interval in the tire circumferential direction between the starting end $31S_1$ and the starting end $31S_2$ is P1, P1/P is preferably from 1/10 to 4/10. The traction (the driving performance) on snow can be improved by offsetting the phases of the tread patterns in the circumferential direction on both sides of the center line CL by from 10 to 40% (phase difference is from 0.1 to 0.4).

The plurality of first lug grooves 32 is provided in the tire circumferential direction. The first lug grooves 32 extend from the respective end portions on the outer side in the tire width direction of the first inclined grooves 31 in the opposite direction to the tire rotation direction C and extend at an inclination towards the outer side in the tire width direction beyond the ground contact edges. The connecting position between the first inclined groove 31 and the first lug groove 32 is provided at a position spaced 30 to 50% of a half of the ground contact width W from the tire center line CL.

The angle between the straight line joining the center points in the groove width direction at both end portions of the first lug groove 32 and the tire width direction is smaller than the angle between the first inclined groove 31 and the tire width direction. Hereafter, this angle is referred to as the inclination angle of the first lug groove 32s. Preferably, the inclination angle of the first lug groove 32s is from 10° to 20°. When the inclination angle of the first lug grooves 32 is within the range from 10° to 20°, the balance between the turning performance and the braking performance of the tire is improved.

The plurality of second inclined grooves 33 is provided in the tire circumferential direction. The second inclined grooves 33 extend from the respective end portions on the outer side in the tire width direction of the first inclined grooves 31 in the opposite direction to the tire rotation direction C and extend at an inclination towards the inner side in the tire width direction. The second inclined groove 33s have a shape in which the groove width gradually widens towards the outer side in the tire width direction and gradually narrows towards the inner side in the tire width direction. Preferably the angle between the straight line joining the center point in the groove width direction at the end on the inner side in the tire width direction of the second inclined groove 33 (a tip when there is no groove width at the end on the inner side in the tire width direction) and the center point in the groove width direction at the end on the outer side in the tire width direction of the second inclined groove 33 and the tire width direction is from 10° to 65°. Hereafter, this angle is referred to as the inclination angle of the second inclined grooves 33. When the inclination angle of the second inclined grooves 33 is 10° or greater, the turning performance of the tire is improved. On the other hand, when the inclination angle of the second inclined grooves 33 is 65° or less, the braking performance of the tire is improved.

Preferably the second inclined groove 33 extends at least as far as another first inclined groove 31 located adjacent in the tire circumferential direction. With the second inclined groove 33 extending as far as another first inclined groove 31 located adjacent, sufficient drainage channels can be ensured.

In addition, the second inclined groove 33 extends as far as another first inclined groove 31 located adjacent in the tire circumferential direction and terminates. However, it is also preferable that the second inclined groove 33 passes through and extends beyond another first inclined groove 31, as described hereafter. With the second inclined groove 33 passing through and extending beyond the first inclined groove 31, edges are created in multiple directions, increasing the friction force due to edges being engaged with the ice (edge effect). Therefore, the braking on ice and turning on ice performances are improved, without reducing the braking on snow, turning on snow, wet braking, and wet turning performances.

The plurality of third inclined grooves 34 is provided in the tire circumferential direction. The third inclined grooves 34 extend from the respective intermediate points on the first lug grooves 32 in the opposite direction to the tire rotation direction C and extend at an inclination towards the outer side in the tire width direction. The third inclined grooves 34 have a shape in which the groove width gradually narrows towards the outer side in the tire width direction and gradually widens towards the inner side in the tire width direction. The angle between the straight line joining the center point in the groove width direction at the end on the inner side in the tire width direction of the third inclined groove 34 and the center point in the groove width direction at the end on the outer side in the tire width direction of the third inclined groove 34 (a tip when there is no groove width at the end on the outer side in the tire width direction) and the tire width direction L is greater than the angle between the first lug groove 32 and the tire width direction L. Hereafter, this angle is referred to as the inclination angle of the third inclined grooves 34. Preferably the inclination angle of the third inclined grooves 34 is from 50° to 80°. When the inclination angle of the third inclined grooves 34 is 50° or greater, the turning performance of the tire is improved. On the other hand, when the inclination angle of the third inclined grooves 34 is 80° or less, the braking performance of the tire is improved.

Second lug grooves 35 may be provided in a region between two first lug grooves 32 located adjacent to each other in the tire circumferential direction where the second lug grooves 35 extend parallel to first lug grooves 32 without crossing with the first inclined grooves 31 and the second inclined grooves 33. Providing the second lug grooves 35 increases the edge effect and drainage effect of the tire 10, thereby improving the braking on ice, turning on ice, braking on snow, turning on snow, wet braking, and wet turning performances.

As illustrated in FIG. 4, the third inclined groove 34 is closed without reaching as far as another first lug groove 32 located adjacent to the first lug groove 32 in the tire rotation direction C (first direction). In this way, it is possible to ensure the tread rigidity of the land portions, and as described hereafter, it is possible to provide stud installation holes 45 with which stud pins can be installed in the land portions.

If the second lug groove 35s are provided, preferably the third inclined grooves 34 extend at least as far as the second lug grooves 35, and more preferably, the third inclined grooves 34 pass through and extend beyond the second lug grooves 35. With the third inclined groove 34 passing through and extending beyond the second lug groove 35, the snow within the second lug groove 35 is compressed and compacted to increase its resistance, so that the snow column shear force can be increased.

If the third inclined grooves 34 pass through and extend beyond the second lug grooves 35, preferably the width of the portions 35A of the second lug grooves 35 on the inner side in the tire width direction of the crossing sections with the third inclined grooves 34 is narrower than the width of the portions 35B on the outer side in the tire width direction of the crossing sections with the third inclined grooves 34. When the width of the portions 35A of the second lug grooves 35 on the inner side in the tire width direction of the crossing sections with the third inclined grooves 34 is narrowed, the area of land portions 41 enclosed by the first inclined grooves 31, the first lug grooves 32, the second inclined grooves 33, and the tread ground contact edges is increased, so that it is possible to increase the adhesion friction force.

Sipes 43 are provided in the land portions 41 enclosed by the first inclined grooves 31, the first lug grooves 32, the second inclined grooves 33, and the tread ground contact edges. Also, sipes 44 are provided in land portions 42 on the inner side in the tire width direction of the first inclined grooves 31 and the second inclined grooves 33. The sipes 44 extend substantially parallel to the tire width direction L. In contrast, the sipes 43 are preferably inclined with respect to the sipes 44. With the sipes 43 being inclined with respect to the sipes 44, it is possible to increase the turning performance of the tire 10.

Also, branch grooves 60 are provided, each extending from an intermediate point on the first inclined groove 31 towards the center line CL. The branch groove 60 preferably has a groove bottom that is shallower than the groove bottom of the first inclined groove 31 with a step at the branching position where the branch groove 60 branches from the first inclined groove 31. In this case, preferably the groove depth of the branch groove 60 becomes gradually shallower towards the center line CL. In this way, it is possible to ensure the tread rigidity of the land portions 42 in the center portion which are enclosed by the first inclined grooves 31 and the second inclined grooves 33 and through which the center line CL passes. Thus, it is possible to improve the tire traction performance.

The branch groove 60 is a groove that is closed before reaching the center line CL, and the closed end is pointed. The branch groove 60 is demarcated by a first edge 60a located on the opposite direction side to the tire rotation direction C (first direction) side, and a second edge 60b located on the tire rotation direction C (first direction) side. In this case, preferably one of the first edge 60a and the second edge 60b extends curved in a curved line shape, and the other extends in a straight line shape, in order to improve the traction performance or the braking performance. In the tread pattern illustrated in FIG. 4, the first edge 60a located in the tire rotation direction C (first direction) side has a curved shape, more specifically a circular arc shape, and the second edge 60b has a straight line shape. In particular, as illustrated in FIG. 4, the first edge 60a extends in the tire width direction, which is orthogonal to the tire rotation direction C, compared to the second edge 60b. Thus, the first edge 60a is formed in a curved shape to increase its length, thereby allowing the traction performance to be increased. Here, "the first edge 60a extends in the tire width direction, which is orthogonal to the tire rotation direction C, compared to the second edge 60b" means that the absolute value of the inclination angle of the straight line that joins both end portions of the first edge 60a with respect to the tire width direction is smaller than the absolute value of the inclination angle of the straight line that joins both end portions of the second edge 60b with respect to the tire width direction.

Also, unlike the tread pattern illustrated in FIG. 4, if the second edge 60b extends in the direction orthogonal to the tire rotation direction C more than the first edge 60a, preferably the second edge 60b is formed in a curved shape. In this case, the second edge 60b is formed in a curved shape to increase its length, thereby allowing the braking performance to be increased. Here, "the second edge 60b extends in the tire width direction more than the first edge 60a" means the absolute value of the angle of inclination of the straight line that joins both end portions of the second edge 60b with respect to the tire width direction is smaller than the absolute value of the angle of inclination of the straight line that joins both end portions of the first edge 60a with respect to the tire width direction.

In the first lug groove 32 and the second lug groove 35 located adjacent to each other in the tire circumferential direction in the tread pattern illustrated in FIG. 4, if the distance in the tire circumferential direction between the position A (the center position in the groove width direction) in the tire circumferential direction of the first lug groove 32 at the ground contact edges E1, E2 and the position B (the center position in the groove width direction) in the tire circumferential direction of the second lug groove 35 at the ground contact edges E1, E2 is Le, preferably the branching position in the tire circumferential direction where the branch groove 60 branches from the first inclined groove 31 (the center position in the groove width direction at the position of the branch of the branch groove 60) is located in a region extending, in the tire circumferential direction from the position A to the position B, 20% to 80% the length of the distance Le. In this way, the first lug groove 32, the branch groove 60, and the second lug groove 35 successively enter the ground contact region which comes into contact with the ground surface; thus, it is possible to always effectively exhibit the function of the edge component of the land portions, which affects the braking performance or the traction performance.

Also, the stud installation holes 45 are provided in the land portion 41 enclosed by the first inclined groove 31, the first lug groove 32, the second inclined groove 33, and the tread ground contact edge, as illustrated in FIG. 4. By installing stud pins, which are not illustrated in the drawings, in the stud installation holes, the tire 10 functions as a studded tire, and the performance on ice, namely the braking on ice and the turning on ice performances, is improved.

According to the pneumatic tire 10 as described above, it is possible to increase the performance on ice, namely the braking on ice and turning on ice performances, while also increasing the performance on snow, namely the braking on snow and turning on snow performances, and the wet performance, namely the wet braking and wet turning performances.

Other Embodiments

In this embodiment, the second inclined groove 33 in the tread pattern illustrated in FIG. 4 is formed so as to extend to the first inclined groove 31. However, the tread pattern can be formed so as to have a branch groove extending towards the center line CL from a branching position at an intermediate point on the first inclined groove 31 that is different from the branching position illustrated in FIG. 4, while the second inclined groove 33 terminates at the first inclined groove 31.

Figure 5:
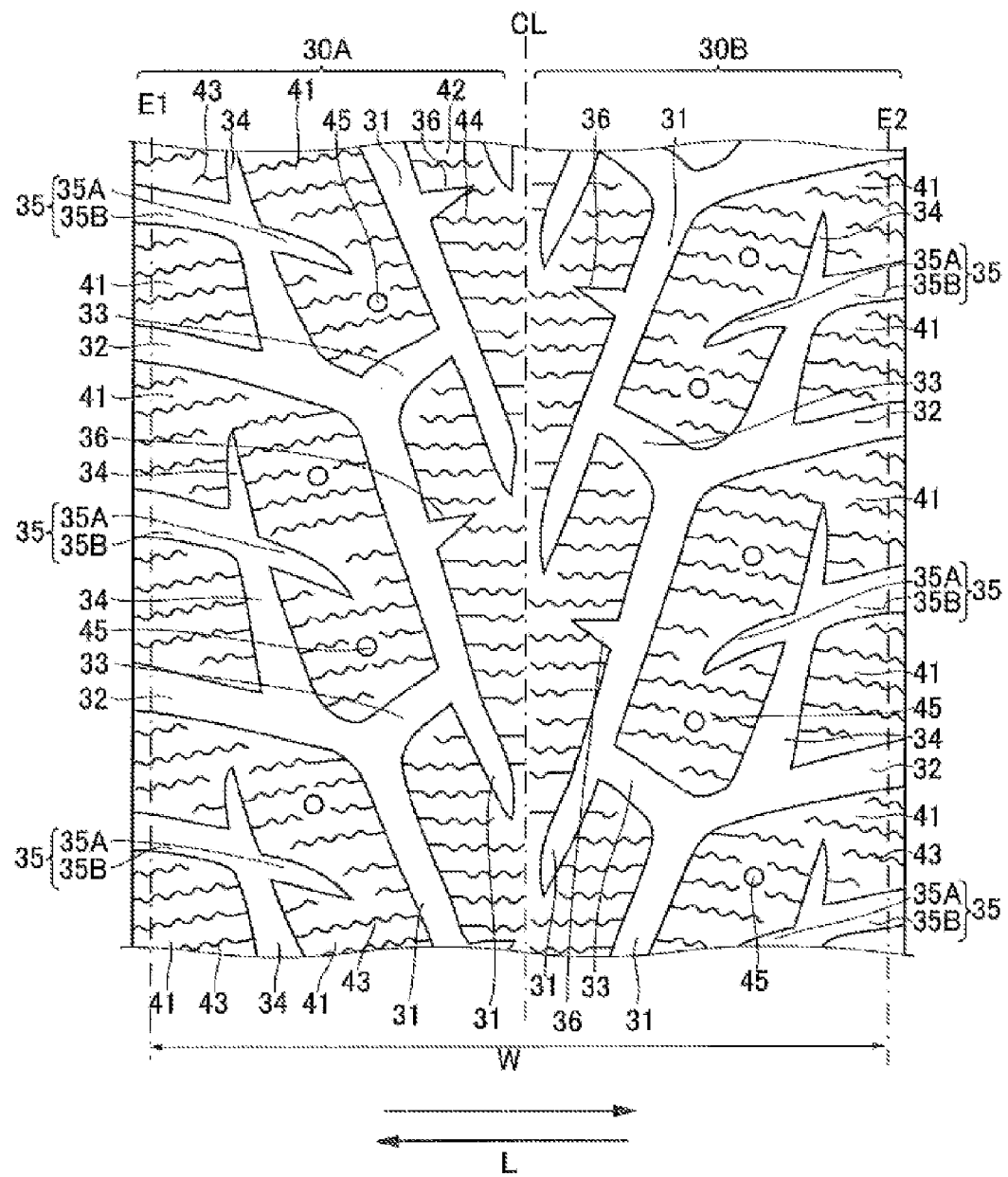
FIG. 5 is a developed view illustrating a tread pattern of the pneumatic tire according to another embodiment of the present technology.

FIG. 5 is a plan developed view of the tread pattern of the tire according to another embodiment of the present technology.

For example, as illustrated in FIG. 5, fourth inclined grooves 36 extending in one direction of the tire circumferential direction and extending at an inclination towards the inner side in the tire width direction from intermediate points on the first inclined grooves 31 may be provided as branch grooves at approximately the same positions as the positions B in the tire circumferential direction at the ground contact edges E1, E2 of the second lug grooves 35. Providing the fourth inclined grooves 36 increases the edge effect in multiple directions, and the braking on ice and turning on ice performances are increased, without reducing the braking on snow, turning on snow, wet braking, and wet turning performances. In this case, the second inclined groove 33 need not pass through and extend beyond another first inclined groove 31 located adjacent in the tire circumferential direction.

Figure 6A:
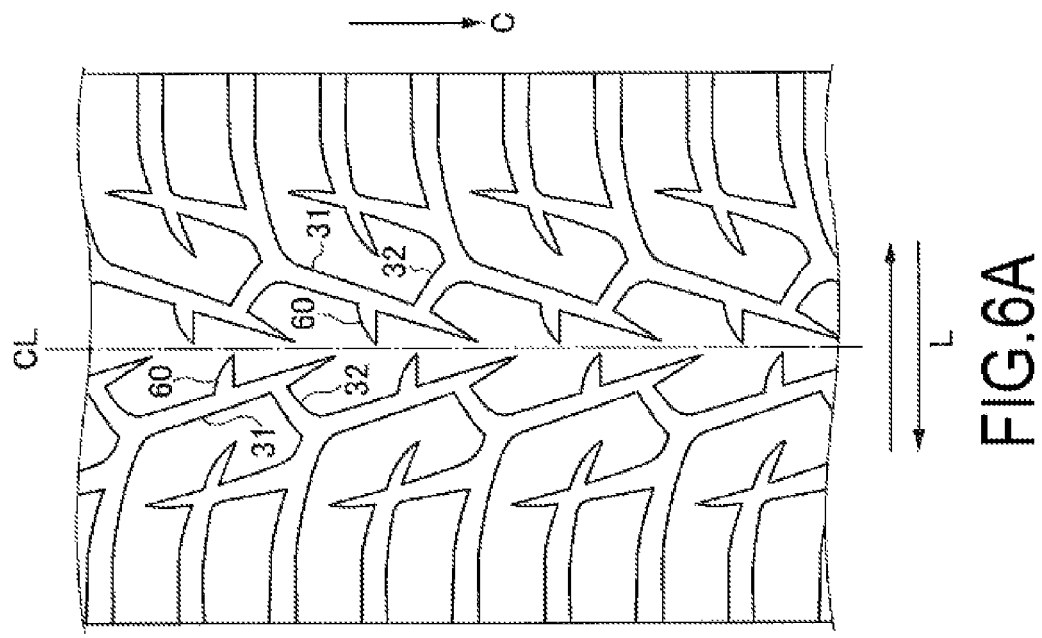
FIGS. 6A and 6B are plan developed views of the tread patterns of the pneumatic tire according to yet another embodiment of the present technology.
Figure 6B:
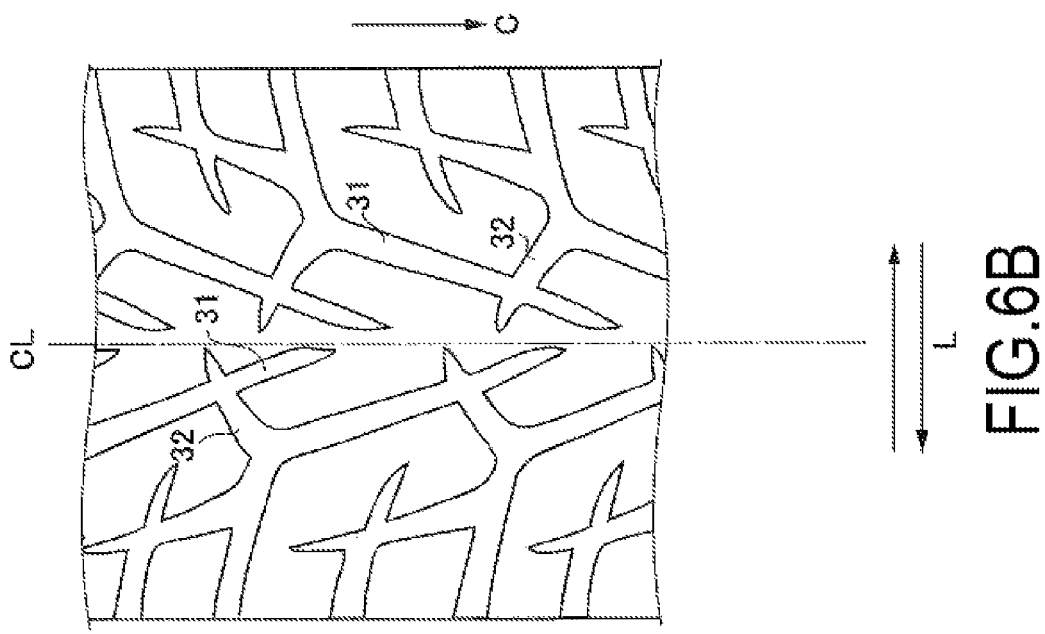

FIGS. 6A and 6B are plan developed views of the tread pattern of the tire according to yet another embodiment of the present technology. In FIGS. 6A and 6B, the sipes, the stud installation holes, and the stud pins have been omitted from the drawings. As illustrated in FIG. 6A, the second inclined groove 33 passes through and extends beyond another first inclined groove 31 located adjacent in the tire circumferential direction, and may be closed before reaching the tire center line CL.

Also, as illustrated in FIG. 6B, the branch groove 60 that extends from an intermediate point on the first inclined groove 31 towards the center line CL may extend in the rotation direction (second direction) of the tire circumferential direction or may extend parallel to the tire width direction L. In this case, preferably the branching position of the branch groove 60 from the first inclined groove 31 is located at an intermediate portion between the starting ends on the inner side in the tire width direction of first inclined grooves 31 located adjacent to each other in the tire width direction. With the branching position located at the intermediate portion as described above, it is possible to reduce the fluctuation in the block rigidity in the tire circumferential direction in the center land portion formed by being enclosed by first inclined grooves 31 that are arranged in the tire circumferential direction, second inclined grooves 33, and center line CL.

As illustrated in FIG. 4, the groove width of the first inclined groove 31 is substantially constant in the center portion in the extending direction of the first inclined groove 31, but in a portion on the end side within a certain range from the starting end, the groove width is gradually reduced as the starting end on the inner side in the tire width direction is approached. In this case, as illustrated in FIGS. 6A and 6B, the extent of the rate of reduction in groove width may be freely set.

Preferably the portion of the second inclined groove 33 that passes through and extends beyond another first inclined groove 31 located adjacent in the tire circumferential direction as illustrated in FIG. 6A and the position at which the branch groove 60 extends from the first inclined groove 31 have a groove bottom shallower than the groove bottom of the first inclined groove 31 with a step. In this case, preferably the groove depth of these grooves become gradually shallower towards the center line CL.

Experiment Examples

In order to investigate the effect of the tread patterns 30A, 30B of the tire 10 according to the present technology, tires were produced provided with tread patterns conforming to the specifications shown in Tables 1 to 3, and their performances were evaluated.

The tire size was 205/55R16. The vehicle used to evaluate the tire performance was a front engine, front wheel drive (FF) vehicle with a 2000 cc class engine displacement. The internal pressure condition was 230 (kPa) for both the front wheels and rear wheels. The load on the tires was 450 kgf for the front wheels and 300 kgf for the rear wheels.

In the tires according to Working Examples 1 to 13 shown in the following Table 1, the first inclined grooves 31, the second inclined grooves 33, the third inclined grooves 34, the first lug grooves 32, and the sipes 43, 44 were formed in the tread portion T. The inclination angles of the first inclined groove 31, the second inclined groove 33, and the third inclined groove 34 are as shown in Table 1. Here, the inclination angle of the first inclined groove 31 is the angle between the straight line that joins both ends of the first inclined groove 31 and the tire width direction L. Likewise, the inclination angle of the second inclined groove 33 is the angle between the straight line that joins both ends of the second inclined groove 33 and the tire width direction L. Also, the inclination angle of the third inclined groove 34 is the angle between the straight line that joins both ends (if the end has a groove width, the center in the groove width direction shall be the end) of the third inclined groove 34 and the tire width direction L.

The tire according to Working Example 14 illustrated in Table 2 is the same as the tire according to Working Example 3 except that in addition the second inclined groove 33 reaches the first inclined groove 31.

The tire according to Working Example 15 is the same as the tire according to Working Example 14 except that in addition the second inclined groove 33 passes through and extends beyond the first inclined groove 31.

The tire according to Working Example 16 is the same as Working Example 15 except that in addition the second lug groove 35 is formed between first lug grooves 32.

The tire according to Working Example 17 is the same as the tire according to Working Example 16 except that the third inclined groove 34 reaches the second lug groove 35. In this case, the third inclined groove 34 is closed without reaching a first inclined groove 31 located adjacent in the tire circumferential direction.

The tire according to Working Example 18 is the same as the tire according to Working Example 17 except that in addition the third inclined groove 34 passes through and extends beyond the second lug groove 35. In this case, the third inclined groove 34 is closed without reaching a first inclined groove 31 located adjacent in the tire circumferential direction.

The tire according to Working Example 19 is the same as the tire according to Working Example 18 except that in addition the width of the second lug groove 35 is changed between the portion on the outer side in the tire width direction of the crossing section with the third inclined groove 34 and the portion on the inner side in the tire width direction.

The tire according to Working Example 20 is the same as the tire according to Working Example 19 except that when P is the average interval in the tire circumferential direction between starting ends of the first inclined grooves 31, the positions of the starting ends of the first inclined grooves 31 in the left and right tread patterns are offset by 0.3 P (a phase difference of 0.3).

The tire according to Working Example 21 is the same as the tire according to Working Example 20 except that the sipes 43 provided in the land portions 41 enclosed by the first lug grooves 32, the first inclined grooves 31, the second inclined grooves 33, and tread ground contact edges are inclined by 10° to the sipes 44 provided in the land portions 42 on the inner side in the tire width direction of the first inclined grooves 31 and the second inclined grooves 33.

The tire according to Working Example 22 is the same as the tire according to Working Example 21 except that in addition, the fourth inclined grooves 36 illustrated in FIG. 5 are formed.

The tire according to Working Example 23 is the same as the tire according to Working Example 22 except that stud pins are installed in the stud installation holes 45. Note that, in Working Examples 1 to 22, stud pins were not installed in the stud installation holes 45.

Comparative Example 1 shown in the following Table 2 is a conventional tire, with the first inclined grooves 31, the first lug grooves 32, and the sipes only formed in the tread portion T. The inclination angle of the first inclined grooves 31 was 75°.

In Comparative Example 2, in addition to the modification according to Comparative Example 1, the second inclined grooves 33 were formed in the tread portion T. The inclination angle of the second inclined grooves 33 was 35°.

In Comparative Example 3, in addition to the modification according to Comparative Example 1, the third inclined grooves 34 were formed in the tread portion T. The inclination angle of the third inclined grooves 34 was 75°.

Note that in Comparative Examples 1 to 3, stud pins were not installed in the stud installation holes 45.

In Comparative Example 4, the third inclined groove 34 illustrated in FIG. 4 reaches the first lug groove 32 located adjacent in the direction opposite to tire rotation direction C and connects to this first lug groove. In each of Comparative Examples 1 to 3, the third inclined groove 34 does not reach the first lug groove 32 located adjacent.

Working Examples 24 to 26 shown in the following Table 3 are examples in which, in the tread pattern illustrated in FIG. 4, the shapes of the first edges 60a and the second edges 60b of the branch grooves 60 are changed to a curved shape (circular arc shape) or a straight line shape. The branching positions of the branch grooves 60 are provided at positions located separated, in the tire circumferential direction, from the positions in the tire circumferential direction of the first inclined grooves by 0.5 times the distance Le (the distance in the tire circumferential direction between the position A in the tire circumferential direction of the first lug groove 32 and the position B in the tire circumferential direction of the second lug groove 35, as illustrated in FIG. 4). In other words, the branch groove 60 is provided at a position intermediately between the first lug groove 32 and the second lug groove 36.

Working Examples 27 to 31 are examples in which, in the tread pattern illustrated in FIG. 4, the branching position of the branch groove 60 is represented by the distance α×Le from the position in the circumferential direction of the first lug groove, where α is varied from 0.15 to 0.85. The shapes of the first edges 60a of the branch grooves 60 are a curved shape, and the shapes of the second edges 60b are a straight line shape. In Working Examples 24 to 31, stud pins were fitted.

The tire performance of the tires produced as prototypes as described above were evaluated for braking on snow, turning on snow, wet braking, wet turning, braking on ice, and turning on ice performances as described below.

For braking on snow, the tires traveled on a snow-covered road surface in an outdoor tire testing ground, and the braking distance when a brake was applied fully from a speed of 40 km per hour was measured five times, and the average braking distance was obtained. The evaluation was carried out by taking the inverse of the measured values and expressing the values as an index with the inverse of the measured value for Comparative Example 1 as 100. A larger index value indicates superior braking performance on snow.

For turning on snow, turning in a circle at a turning radius of 30 m was carried out five times on a snow-covered road surface in the outdoor tire testing ground, and the average circulating time was obtained. The evaluation was carried out by taking the inverse of the measured values and expressing the values as an index with the inverse of the measured value for Comparative Example 1 as 100. A larger index value indicates superior turning performance on snow.

For braking on ice, the tires traveled on an icy road surface in the outdoor tire testing ground, the braking distance when a brake was applied fully from a speed of 40 km per hour was measured five times, and the average braking distance was obtained. The evaluation was carried out by taking the inverse of the measured values and expressing the values as an index with the inverse of the measured value for Comparative Example 1 as 100. A larger index value indicates superior braking performance on ice.

For turning on ice, turning in a circle at a turning radius of 30 m was carried out five times on an icy road surface in an outdoor tire testing ground, and the average circulating time was obtained. The evaluation was carried out by taking the inverse of the measured values and expressing the values as an index with the inverse of the measured value for Comparative Example 1 as 100. A larger index value indicates superior turning performance on snow.

For wet braking, the tires traveled on a wet road surface with a water depth of 1.0 mm or more in the outdoor tire testing ground, the braking distance when the brake was applied fully from a speed of 40 km per hour was measured five times, and the average braking distance was obtained. The evaluation was carried out by taking the inverse of the measured values, and expressing the values as an index with the inverse of the measured value for Comparative Example 1 as 100. A larger index value indicates superior wet braking performance.

For wet turning, turning in a circle at a turning radius of 30 m was carried out five times on a wet circular turning circuit with a wet road surface (skid pad) in the outdoor tire testing ground, and the average circulating time was obtained. The evaluation was carried out by taking the inverse of the measured values and expressing the values as an index with the inverse of the measured value for Comparative Example 1 as 100. A larger index value indicates superior wet turning performance.

Cases when each value for braking on snow, turning on snow, wet braking, wet turning, braking on ice, and turning on ice is 102 or less were evaluated that there was no significant difference from Comparative Example 1, and cases when the value is 103 or greater were evaluated better than Comparative Example 1.

The evaluation results are shown in Tables 1 to 3.

TABLE 1

|  | Working Examples | | | | | | |
| --- | --- | --- | --- | --- | --- | --- | --- |
|  | 1 | 2 | 3 | 4 | 5 | 6 | 7 |
| Inclination angle of first inclined groove (degrees) | 45 | 50 | 75 | 80 | 85 | 75 | 75 |
| Presence or absence of second inclined groove, and inclination angle thereof (degrees) | 35 | 35 | 35 | 35 | 35 | 5 | 10 |

TABLE 1-continued

|  | | | | | | | |
|---|---|---|---|---|---|---|---|
| Presence or absence of third inclined groove, and inclination angle thereof (degrees) | 75 | 75 | 75 | 75 | 75 | 75 | 75 |
| Presence or absence of first lug groove | Presence | Presence | Presence | Presence | Presence | Presence | Presence |
| Presence or absence of second inclined groove reaching first inclined groove | Absence | Absence | Absence | Absence | Absence | Absence | Absence |
| Presence or absence of second inclined groove passing through first inclined groove | Absence | Absence | Absence | Absence | Absence | Absence | Absence |
| Presence or absence of second lug groove | Absence | Absence | Absence | Absence | Absence | Absence | Absence |
| Presence or absence of third inclined groove reaching another adjacent first lug groove | Absence | Absence | Absence | Absence | Absence | Absence | Absence |
| Presence or absence of third inclined groove reaching second lug groove | Absence | Absence | Absence | Absence | Absence | Absence | Absence |
| Presence or absence of third inclined groove passing through second lug groove | Absence | Absence | Absence | Absence | Absence | Absence | Absence |
| Presence or absence of change in second lug groove width | Absence | Absence | Absence | Absence | Absence | Absence | Absence |
| Left-right phase difference (pitch) | Absence | Absence | Absence | Absence | Absence | Absence | Absence |
| Inclination angle of sipe (degrees) | 0° | 0° | 0° | 0° | 0° | 0° | 0° |
| Presence or absence of fourth inclined groove | Absence | Absence | Absence | Absence | Absence | Absence | Absence |
| Presence or absence of stud pin being fitted | Absence | Absence | Absence | Absence | Absence | Absence | Absence |
| Braking on ice | 110 | 110 | 108 | 106 | 104 | 110 | 110 |
| Turning on ice | 103 | 104 | 110 | 110 | 112 | 105 | 107 |
| Braking on snow | 110 | 110 | 108 | 105 | 103 | 110 | 110 |
| Turning on snow | 103 | 105 | 110 | 110 | 112 | 104 | 107 |
| Wet braking | 108 | 108 | 106 | 105 | 103 | 110 | 110 |
| Wet turning | 103 | 104 | 110 | 110 | 112 | 104 | 106 |

|  | Working Examples | | | | | |
|---|---|---|---|---|---|---|
|  | 8 | 9 | 10 | 11 | 12 | 13 |
| Inclination angle of first inclined groove (degrees) | 75 | 75 | 75 | 75 | 75 | 75 |
| Presence or absence of second inclined groove, and inclination angle thereof (degrees) | 60 | 65 | 35 | 35 | 35 | 35 |
| Presence or absence of third inclined groove, and inclination angle thereof (degrees) | 75 | 75 | 45 | 50 | 80 | 85 |
| Presence or absence of first lug groove | Presence | Presence | Presence | Presence | Presence | Presence |
| Presence or absence of second inclined groove reaching first inclined groove | Absence | Absence | Absence | Absence | Absence | Absence |
| Presence or absence of second inclined groove passing through first inclined groove | Absence | Absence | Absence | Absence | Absence | Absence |
| Presence or absence of second lug groove | Absence | Absence | Absence | Absence | Absence | Absence |
| Presence or absence of third inclined groove reaching another adjacent first lug groove | Absence | Absence | Absence | Absence | Absence | Absence |

TABLE 1-continued

| | | | | | | |
|---|---|---|---|---|---|---|
| Presence or absence of third inclined groove reaching second lug groove | Absence | Absence | Absence | Absence | Absence | Absence |
| Presence or absence of third inclined groove passing through second lug groove | Absence | Absence | Absence | Absence | Absence | Absence |
| Presence or absence of change in second lug groove width | Absence | Absence | Absence | Absence | Absence | Absence |
| Left-right phase difference (pitch) | Absence | Absence | Absence | Absence | Absence | Absence |
| Inclination angle of sipe (degrees) | 0° | 0° | 0° | 0° | 0° | 0° |
| Presence or absence of fourth inclined groove | Absence | Absence | Absence | Absence | Absence | Absence |
| Presence or absence of stud pin being fitted | Absence | Absence | Absence | Absence | Absence | Absence |
| Braking on ice | 107 | 105 | 111 | 111 | 106 | 104 |
| Turning on ice | 111 | 111 | 105 | 106 | 111 | 111 |
| Braking on snow | 107 | 107 | 112 | 112 | 105 | 104 |
| Turning on snow | 111 | 111 | 104 | 105 | 111 | 111 |
| Wet braking | 105 | 103 | 110 | 110 | 105 | 104 |
| Wet turning | 111 | 111 | 104 | 105 | 111 | 111 |

TABLE 2

| | Working Examples | | | | | | |
|---|---|---|---|---|---|---|---|
| | 14 | 15 | 16 | 17 | 18 | 19 | 20 |
| Inclination angle of first inclined groove (degrees) | 75 | 75 | 75 | 75 | 75 | 75 | 75 |
| Presence or absence of second inclined groove, and inclination angle thereof (degrees) | 35 | 35 | 35 | 35 | 35 | 35 | 35 |
| Presence or absence of third inclined groove, and inclination angle thereof (degrees) | 75 | 75 | 75 | 75 | 75 | 75 | 75 |
| Presence or absence of first lug groove | Presence | Presence | Presence | Presence | Presence | Presence | Presence |
| Presence or absence of second inclined groove reaching first inclined groove | Presence | Presence | Presence | Presence | Presence | Presence | Presence |
| Presence or absence of second inclined groove passing through first inclined groove | Absence | Presence | Presence | Presence | Presence | Presence | Presence |
| Presence or absence of second lug groove | Absence | Absence | Presence | Presence | Presence | Presence | Presence |
| Presence or absence of third inclined groove reaching another adjacent first lug groove | Absence | Absence | Absence | Absence | Absence | Absence | Absence |
| Presence or absence of third inclined groove reaching second lug groove | Absence | Absence | Absence | Presence | Presence | Presence | Presence |
| Presence or absence of third inclined groove passing through second lug groove | Absence | Absence | Absence | Absence | Presence | Presence | Presence |
| Presence or absence of change in second lug groove width | Absence | Absence | Absence | Absence | Absence | Presence | Presence |
| Left-right phase difference (pitch) | Absence | Absence | Absence | Absence | Absence | Absence | 0.3 |
| Inclination angle of sipe (degrees) | 0° | 0° | 0° | 0° | 0° | 0° | 0° |

TABLE 2-continued

| | | | | | | | |
|---|---|---|---|---|---|---|---|
| Presence or absence of fourth inclined groove (branch groove) | Absence | Absence | Absence | Absence | Absence | Absence | Absence |
| Presence or absence of stud pin being fitted | Absence | Absence | Absence | Absence | Absence | Absence | Absence |
| Braking on ice | 108 | 110 | 112 | 112 | 113 | 114 | 114 |
| Turning on ice | 107 | 108 | 109 | 111 | 112 | 111 | 112 |
| Braking on snow | 108 | 110 | 112 | 112 | 113 | 114 | 114 |
| Turning on snow | 107 | 107 | 108 | 109 | 110 | 110 | 111 |
| Wet braking | 106 | 108 | 109 | 110 | 110 | 110 | 110 |
| Wet turning | 106 | 107 | 108 | 108 | 108 | 108 | 109 |

| | Working Examples | | | Comparative Examples | | | |
|---|---|---|---|---|---|---|---|
| | 21 | 22 | 23 | 1 | 2 | 3 | 4 |
| Inclination angle of first inclined groove (degrees) | 75 | 75 | 75 | 75 | 75 | 75 | 75 |
| Presence or absence of second inclined groove, and inclination angle thereof (degrees) | 35 | 35 | 35 | Absence | 35 | Absence | 35 |
| Presence or absence of third inclined groove, and inclination angle thereof (degrees) | 75 | 75 | 75 | Absence | Absence | 75 | 75 |
| Presence or absence of first lug groove | Presence | Presence | Presence | Presence | Presence | Presence | Presence |
| Presence or absence of second inclined groove reaching first inclined groove | Presence | Presence | Presence | Absence | Absence | Absence | Presence |
| Presence or absence of second inclined groove passing through first inclined groove | Presence | Absence | Absence | Absence | Absence | Absence | Presence |
| Presence or absence of second lug groove | Presence | Presence | Presence | Absence | Absence | Absence | Presence |
| Presence or absence of third inclined groove reaching another adjacent first lug groove | Absence | Absence | Absence | Absence | Absence | Absence | Presence |
| Presence or absence of third inclined groove reaching second lug groove | Presence | Presence | Presence | Absence | Absence | Absence | Presence |
| Presence or absence of third inclined groove passing through second lug groove | Presence | Presence | Presence | Absence | Absence | Absence | Presence |
| Presence or absence of change in second lug groove width | Presence | Presence | Presence | Absence | Absence | Absence | Presence |
| Left-right phase difference (pitch) | 0.3 | 0.3 | 0.3 | Absence | Absence | Absence | 0.3 |
| Inclination angle of sipe (degrees) | 10° | 10° | 10° | 0° | 0° | 0° | 10° |
| Presence or absence of fourth inclined groove (branch groove) | Absence | Presence | Presence | Absence | Absence | Absence | Absence |
| Presence or absence of stud pin being fitted | Absence | Absence | Presence | Absence | Absence | Absence | Absence |
| Braking on ice | 114 | 116 | 130 | 100 | 104 | 103 | 101 |
| Turning on ice | 113 | 114 | 128 | 100 | 103 | 104 | 101 |
| Braking on snow | 114 | 115 | 115 | 100 | 102 | 103 | 102 |
| Turning on snow | 112 | 114 | 114 | 100 | 103 | 102 | 102 |
| Wet braking | 110 | 113 | 113 | 100 | 102 | 104 | 102 |
| Wet turning | 110 | 112 | 112 | 100 | 103 | 102 | 102 |

TABLE 3

| | Working Examples | | | | | | | |
|---|---|---|---|---|---|---|---|---|
| | 24 | 25 | 26 | 27 | 28 | 29 | 30 | 31 |
| Inclination angle of first inclined groove (degrees) | 75 | 75 | 75 | 75 | 75 | 75 | 75 | 75 |
| Presence or absence of second inclined groove, and inclination angle thereof (degrees) | 35 | 35 | 35 | 35 | 35 | 35 | 35 | 35 |
| Presence or absence of third inclined groove, and inclination angle thereof (degrees) | 75 | 75 | 75 | 75 | 75 | 75 | 75 | 75 |
| Presence or absence of first lug groove | Presence | Presence | Presence | Presence | Presence | Presence | Presence | Presence |
| Presence or absence of second inclined groove reaching first inclined groove | Presence | Presence | Presence | Presence | Presence | Presence | Presence | Presence |
| Presence or absence of second inclined groove passing through first inclined groove | Absence | Absence | Absence | Absence | Absence | Absence | Absence | Absence |
| Presence or absence of second lug groove | Presence | Presence | Presence | Presence | Presence | Presence | Presence | Presence |
| Presence or absence of third inclined groove reaching another adjacent first lug groove | Absence | Absence | Absence | Absence | Absence | Absence | Absence | Absence |
| Presence or absence of third inclined groove reaching second lug groove | Presence | Presence | Presence | Presence | Presence | Presence | Presence | Presence |
| Presence or absence of third inclined groove passing through second lug groove | Presence | Presence | Presence | Presence | Presence | Presence | Presence | Presence |
| Presence or absence of change in second lug groove width | Presence | Presence | Presence | Presence | Presence | Presence | Presence | Presence |
| Left-right phase difference (pitch) | 0.3 | 0.3 | 0.3 | 0.3 | 0.3 | 0.3 | 0.3 | 0.3 |
| Inclination angle of sipe (degrees) | 10° | 10° | 10° | 10° | 10° | 10° | 10° | 10° |
| Presence or absence of fourth inclined groove (branch groove) | Presence | Presence | Presence | Presence | Presence | Presence | Presence | Presence |

TABLE 3-continued

| | Working Examples | | | | | | | |
|---|---|---|---|---|---|---|---|---|
| | 24 | 25 | 26 | 27 | 23 | 29 | 30 | 31 |
| Shape of first edge, second edge of branch groove | Curved line, straight line | Straight line, curved line | Straight line, straight line | Curved line, straight line | Curved line, straight line | Curved line, straight line | Curved line, straight line | Curved line, straight line |
| Distance in the circumferential direction from position A in the circumferential direction of first lug groove to branching position of branch groove | 0.5 XLe | 0.5 XLe | 0.5 XLe | 0.15 XLe | 0.2 XLe | 0.4 XLe | 0.8 XLe | 0.85 XLe |
| Presence or absence of stud pin being fitted | Presence | Presence | Presence | Presence | Presence | Presence | Presence | Presence |
| Braking on ice | 133 | 132 | 130 | 131 | 133 | 134 | 133 | 131 |
| Turning on ice | 130 | 131 | 128 | 130 | 132 | 133 | 131 | 130 |
| Braking on snow | 117 | 116 | 115 | 114 | 115 | 118 | 117 | 115 |
| Turning on snow | 116 | 115 | 114 | 114 | 115 | 116 | 114 | 112 |
| Wet braking | 115 | 114 | 113 | 113 | 115 | 116 | 114 | 112 |
| Wet turning | 114 | 113 | 112 | 112 | 114 | 115 | 113 | 112 |

[Presence or Absence of Second Inclined Groove and Third Inclined Groove]

The difference in the turning performance and the braking performance due to the presence or absence of the second inclined groove 33 and the third inclined groove 34 was examined with reference to Working Example 3 and Comparative Examples 1 to 3.

Comparing Working Example 3 with Comparative Examples 1 to 3, it can be seen that the turning performance and the braking performance on ice, on snow, and on wet road surfaces are each improved when both the second inclined groove 33 and the third inclined groove 34 are provided (Working Example 3) more than the cases where both the second inclined groove 33 and the third inclined groove 34 are absent (Comparative Example 1), where the third inclined groove 34 is absent (Comparative Example 2), and where the second inclined groove 33 is absent (Comparative Example 3).

[Optimum Angle of First Inclined Groove]

The inclination angle of the first inclined groove 31 was varied within Working Examples 1 to 5, with Working Example 3 as a center. Examining Working Examples 1 to 5, it can be seen that the greater the inclination angle of the first inclined groove 31, the greater the edge effect with respect to the lateral direction, so the turning performance is improved. On the other hand, the greater the inclination angle of the first inclined groove 31, the greater the reduction in the edge effect with respect to the longitudinal direction, so it can be seen that the braking performance becomes poorer. It can be seen that when the inclination angle of the first inclined groove 31 is in the range from 50° to 80°, there is a good balance between the turning performance and the braking performance, which is desirable.

[Optimum Angle of Second Inclined Groove]

The inclination angle of the second inclined groove 33 was varied within Working Examples 6 to 9, with Working Example 3 as a center. Examining Working Example 3 and Working Examples 6 to 9, it can be seen that the greater the inclination angle of the second inclined groove 33, the greater the edge effect with respect to the lateral direction, so the turning performance is improved. On the other hand, the greater the inclination angle of the second inclined groove 33, the greater the reduction in the edge effect with respect to the longitudinal direction, so it can be seen that the braking performance becomes poorer. It can be seen that when the inclination angle of the second inclined groove 33 is in the range from 10° to 65°, there is a good balance between the turning performance and the braking performance, which is desirable.

[Optimum Angle of Third Inclined Groove]

The inclination angle of the third inclined groove 34 was varied with Working Examples 10 to 13, with Working Example 3 as a center. Examining Working Example 3 and Working Examples 10 to 13, it can be seen that the greater the inclination angle of the third inclined groove 34, the greater the edge effect with respect to the lateral direction, so the turning performance is improved. On the other hand, the greater the inclination angle of the third inclined groove 34, the greater the reduction in the edge effect with respect to the longitudinal direction, so it can be seen that the braking performance becomes poorer. It can be seen that when the inclination angle of the third inclined groove 34 is in the range from 50° to 80°, there is a good balance between the turning performance and the braking performance, which is desirable.

[Presence or Absence of Second Inclined Groove Reaching First Inclined Groove]

Comparing Working Example 3 with Working Example 14, it can be seen that the turning performance and the braking performance of the case in which the second inclined groove 33 reaches the first inclined groove 31 (Working Example 14) are equivalent to those of the case where the second inclined groove 33 does not reach the first inclined groove 31 (Working Example 3).

[Presence or Absence of Second Inclined Groove Passing Through First Inclined Groove]

Comparing Working Example 14 with Working Example 15, it can be seen that the braking performance on ice, the braking performance on snow, and the wet braking performance are higher, and the turning performance on ice and the wet braking performance are fairly higher in the case where the second inclined groove 33 passes through the first inclined groove 31 (Working Example 15) than in the case where the second inclined groove 33 does not pass through the first inclined groove 31 (Working Example 14).
[Presence or Absence of Second Lug Groove]

Comparing Working Example 15 with Working Example 16, it can be seen that the braking performance on ice and the braking performance on snow are higher, and the wet braking performance, the turning performance on ice, the turning performance on snow, and the wet turning performance are fairly higher in the case where the second lug groove 35 is present (Working Example 16) than in the case where the second lug groove 35 is absent (Working Example 15).
[Presence or Absence of Third Inclined Groove Reaching Second Lug Groove]

Comparing Working Example 16 with Working Example 17, it can be seen that the turning performance on ice is higher, and the turning performance on snow and the wet braking performance are also higher in the case where the third inclined groove reaches the second lug groove 35 (Working Example 17) than in the case where the third inclined groove does not reach the second lug groove 35 (Working Example 16).
[Presence or Absence of Third Inclined Groove Passing Through Second Lug Groove]

Comparing Working Example 17 with Working Example 18, it can be seen that the braking performance on ice, the braking performance on snow, the turning performance on ice, and the turning performance on snow are fairly higher in the case where the third inclined groove passes through the second lug groove 35 (Working Example 18) than in the case where the third inclined groove does not pass through the second lug groove 35 (Working Example 17).
[Presence or Absence of Change in Second Lug Groove Width]

Comparing Working Example 18 with Working Example 19, it can be seen that the braking performance on ice and the braking performance on snow are fairly higher in the case where there is a change in the width of the second lug groove 35 at the portion on the inner side and the portion on the outer side in the tire width direction L of the crossing section of the second lug groove 35 with the third inclined groove (Working Example 19) than in the case where there is no change in width of the second lug groove 35 (Working Example 18). On the other hand, it can be seen that the turning performance on ice is fairly higher in the case where there is no change in the width of the second lug groove (Working Example 18).
[Left-Right Phase Difference (Pitch)]

Comparing Working Example 19 with Working Example 20, it can be seen that the turning performance on ice, the turning performance on snow, and the wet turning performance are fairly higher in the case where the phase difference is 0.3 (Working Example 20) than in the case where there is no phase difference between the left and right tread patterns (Working Example 19).
[Inclination Angle of Sipe]

Comparing Working Example 20 with Working Example 21, it can be seen that the turning performance on ice, the turning performance on snow, and the wet turning performance are fairly higher in the case where the sipes 43 are inclined at 10° to the sipes 44 (Working Example 21) than in the case where the directions of all the sipes 43, 44 are substantially the same as the tire width direction L (Working Example 20).
[Presence or Absence of Fourth Inclined Groove (Branch Groove)]

Comparing Working Example 21 with Working Example 22, it can be seen that in particular the wet braking performance is higher in the case where the fourth inclined groove 36 is present (Working Example 22) than in the case where the fourth inclined groove 36 is absent (Working Example 21). Also, it can be seen that the braking performance on ice, the turning performance on snow, and the wet turning performance are higher, and the braking performance on snow and the turning performance on ice are fairly higher.
[Presence or Absence of Stud Pins Being Fitted]

Comparing Working Example 22 with Working Example 23, it can be seen that the braking performance on ice and the turning performance on ice are higher in the case where the stud pins are fitted (Working Example 23) than in the case where the stud pins are not fitted (Working Example 22).
[Presence or Absence of Third Inclined Groove Reaching Another Adjacent First Inclined Groove]

Comparing Working Example 21 with Comparative Example 4, it can be seen that the braking performance on ice, the turning performance on ice, the braking performance on snow, the turning performance on snow, the wet braking performance, and the wet turning performance are all increased in the case where the third inclined groove does not reach another first lug groove compared with the case where the third inclined groove does reach another first lug groove (Comparative Example 4).
[Shape of First Edge and Second Edge of Branch Groove 60]

Comparing Working Examples 24 to 26, it can be seen that the braking performance on ice, the turning performance on ice, the braking performance on snow, the turning performance on snow, the wet braking performance, and the wet turning performance are all increased in the case where one of the first edge and the second edge is a curved shape.
[Distance in the Circumferential Direction from the Position of First Lug Groove 32 to the Branching Position of Branch Groove 60]

Comparing Working Examples 27 to 31, it can be seen that it is preferable that the braking performance on ice, the turning performance on ice, the wet braking performance, and the wet turning performance are increased by locating the branching position of the branch groove 60 at a distance 0.2 to 0.8 times the distance Le from the position of the first lug groove 32.

The pneumatic tire of the present technology was described in detail above. However, it should be understood that the present technology is not limited to the above embodiments, but may be improved or modified in various ways so long as these improvements or modifications remain within the scope of the present technology.

What is claimed is:

1. A pneumatic tire having a tread pattern formed in each of half tread regions of a tread portion, the half tread regions being located on both sides in a tire width direction with a tire center line as a boundary, the pneumatic tire comprising:
in each of the half tread regions,
a first inclined groove group having a plurality of first inclined grooves provided in a tire circumferential direction, the first inclined grooves each having a position located separated from the center line as a starting end, extending in a first direction of the tire circumferential direction as well as at an inclination towards an outer side in the tire width direction;
a first lug groove group having a plurality of first lug grooves provided in the tire circumferential direction, the first lug grooves extending from respective end portions on the outer side in the tire width direction of the first inclined grooves in the first direction of the tire circumferential direction as well as at an inclination towards the outer side in the tire width direction as far as a ground contact edge, and having an angle formed with the tire width direction smaller than an angle formed with the tire width direction of the first inclined grooves;

a second inclined groove group having a plurality of second inclined grooves provided in the tire circumferential direction, the second inclined grooves extending from respective end portions on the outer side in the tire width direction of the first inclined grooves in the first direction of the tire circumferential direction as well as at an inclination towards an inner side in the tire width direction; and a third inclined groove group having a plurality of third inclined grooves provided in the tire circumferential direction, the third inclined grooves extending from respective intermediate points on the first lug grooves in the first direction of the tire circumferential direction as well as at an inclination towards the outer side in the tire width direction, and having an angle formed with the tire width direction larger than the angle formed with the tire width direction of the first lug grooves, each third inclined groove being closed without reaching another first lug groove located adjacent to each first lug groove in the first direction.

2. The pneumatic tire according to claim 1, further comprising branch grooves extending from respective intermediate points on the first inclined grooves towards the center line, each branch groove having a groove bottom shallower than a groove bottom of the first inclined groove with a step at a branching position where each branch groove branches from each first inclined groove; and a groove depth of the branch groove being gradually shallower towards the center line.

3. The pneumatic tire according to claim 2, wherein the branch grooves are closed before reaching the center line, each branch groove being demarcated by a first edge located on a side in the first direction, and a second edge located on a side in a direction opposite to the first direction, and one of the first edge and the second edge extends in a curved line shape and the other extends in a straight line shape.

4. The pneumatic tire according to claim 2, wherein the branch grooves are fourth inclined grooves extending in the first direction of the tire circumferential direction and extending at an inclination towards the inner side in the tire width direction.

5. The pneumatic tire according to claim 2, wherein the branch grooves are fourth inclined grooves extending in a second direction opposite to the first direction of the tire circumferential direction or grooves extending parallel to the tire width direction.

6. The pneumatic tire according to claim 2, further comprising branch grooves extending from respective intermediate points on the first inclined grooves towards the center line, wherein second lug grooves are provided between two of the plurality of first lug grooves located adjacent to each other in the tire circumferential direction, each extending parallel to the first lug grooves, and upon a distance in the tire circumferential direction between one of the first lug grooves and one of the second lug grooves located adjacent to each other in the tire circumferential direction, being Le, the branching positions in the tire circumferential direction where the branch grooves branch from the first inclined grooves are each located in a region 0.2 or greater and 0.8 or less times the distance Le away from a position A in the tire circumferential direction at the ground contact edge of the first lug groove towards a position B in the tire circumferential direction at a ground contact edge of the second lug groove.

7. The pneumatic tire according to claim 1, wherein the second lug grooves are provided between two of the plurality of first lug grooves located adjacent to each other in the tire circumferential direction, each extending parallel to the first lug grooves.

8. The pneumatic tire according to claim 1, wherein the second inclined grooves each extends at least as far as another first inclined groove located adjacent in the tire circumferential direction.

9. The pneumatic tire according to claim 1, wherein the second inclined grooves each passes through and extends beyond another first inclined groove located adjacent in the tire circumferential direction.

10. The pneumatic tire according to claim 1, wherein second lug grooves are provided between two of the plurality of first lug grooves located adjacent to each other in the tire circumferential direction, each extending parallel to the first lug grooves, and the third inclined grooves extend at least as far as the second lug grooves.

11. The pneumatic tire according to claim 1, wherein second lug grooves are provided between two of the plurality of first lug grooves located adjacent to each other in the tire circumferential direction, each extending parallel to the first lug grooves, and the third inclined grooves pass through and extend beyond the second lug grooves.

12. The pneumatic tire according to claim 11, wherein a groove width of portions of the second lug grooves on the inner side in the tire width direction of crossing sections with the third inclined grooves is narrower than a groove width of portions on the outer side in the tire width direction of the crossing sections with the third inclined grooves.

13. The pneumatic tire according to claim 1, wherein an angle between a straight line joining both ends of each first inclined groove and the tire width direction is from 50° to 80°.

14. The pneumatic tire according to claim 1, wherein an angle between a straight line joining both ends of each second inclined groove and the tire width direction is from 10° to 65°.

15. The pneumatic tire according to claim 1, wherein an angle between a straight line joining both ends of each third inclined groove and the tire width direction is from 50° to 80°.

16. The pneumatic tire according to claim 1, wherein the starting ends of the first inclined grooves of the first inclined groove group on a first side of the center line are offset in the tire circumferential direction from the starting ends of the first inclined grooves of the first inclined groove group on a second side by ¹⁄₁₀ to ⁴⁄₁₀ of an average distance in the tire circumferential direction between adjacent first inclined grooves.

17. The pneumatic tire according to claim 1, wherein a plurality of sipes is provided in land portions of the tread portion, and sipes provided in the land portions enclosed by the first lug grooves, the first inclined grooves, the second inclined grooves, and tread ground contact edges are inclined with respect to sipes provided in the land portions on the inner side in the tire width direction of the first inclined grooves and the second inclined grooves.

18. The pneumatic tire according to claim 1, wherein stud installation holes are provided in the land portions enclosed by the first lug grooves, the first inclined grooves, the second inclined grooves, and the tread ground contact edges.

19. The pneumatic tire according to claim 3, wherein the branch grooves are fourth inclined grooves extending in the first direction of the tire circumferential direction and extending at an inclination towards the inner side in the tire width direction.

20. The pneumatic tire according to claim 3, wherein the branch grooves are fourth inclined grooves extending in a second direction opposite to the first direction of the tire circumferential direction or grooves extending parallel to the tire width direction.

* * * * *